United States Patent
Okamatsu et al.

(10) Patent No.: US 11,104,087 B2
(45) Date of Patent: Aug. 31, 2021

(54) TIRE SEALANT AND TIRE REPAIR KIT

(71) Applicant: THE YOKOHAMA RUBBER CO., LTD., Tokyo (JP)

(72) Inventors: Takahiro Okamatsu, Hiratsuka (JP); Kiyohito Takahashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 285 days.

(21) Appl. No.: 16/345,431

(22) PCT Filed: Nov. 10, 2017

(86) PCT No.: PCT/JP2017/040619
§ 371 (c)(1),
(2) Date: Apr. 26, 2019

(87) PCT Pub. No.: WO2018/088533
PCT Pub. Date: May 17, 2018

(65) Prior Publication Data
US 2019/0248082 A1    Aug. 15, 2019

(30) Foreign Application Priority Data

Nov. 10, 2016 (JP) .............................. JP2016-219867

(51) Int. Cl.
| | |
|---|---|
| *B29C 73/16* | (2006.01) |
| *C08L 7/02* | (2006.01) |
| *C09K 3/10* | (2006.01) |
| *B29C 73/02* | (2006.01) |
| *C08L 83/04* | (2006.01) |
| *C08L 101/00* | (2006.01) |
| *C08K 5/20* | (2006.01) |
| *C08L 31/04* | (2006.01) |
| *C08K 5/13* | (2006.01) |
| *C08K 5/21* | (2006.01) |
| *C08K 5/053* | (2006.01) |

(52) U.S. Cl.
CPC ............ *B29C 73/163* (2013.01); *B29C 73/02* (2013.01); *B29C 73/025* (2013.01); *C08K 5/053* (2013.01); *C08K 5/13* (2013.01); *C08K 5/20* (2013.01); *C08K 5/21* (2013.01); *C08L 7/02* (2013.01); *C08L 31/04* (2013.01); *C08L 83/04* (2013.01); *C08L 101/00* (2013.01); *C09K 3/10* (2013.01); *C08L 2201/52* (2013.01); *C09K 2200/0607* (2013.01); *C09K 2200/0642* (2013.01)

(58) Field of Classification Search
CPC ......... B29C 73/163; C08K 5/06; C08L 71/02; C09K 3/10
See application file for complete search history.

(56) References Cited

U.S. PATENT DOCUMENTS

| | | | |
|---|---|---|---|
| 3,352,696 A | 11/1967 | Wallace | |
| 2015/0291775 A1* | 10/2015 | Okamatsu | ............ C09K 3/1015 524/45 |
| 2015/0344743 A1 | 12/2015 | Ichikawa | |

FOREIGN PATENT DOCUMENTS

| | | |
|---|---|---|
| GB | 767 168 A | 1/1957 |
| GB | 2 370 574 A | 7/2002 |
| JP | 2011-162681 A | 8/2011 |
| JP | 2015-129216 A | 7/2015 |

OTHER PUBLICATIONS

Office Action dated Jun. 9, 2021 issued in the corresponding German Patent Application No. 112017005667.5 with a partial English translation thereof.

* cited by examiner

*Primary Examiner* — Edward J Cain
(74) *Attorney, Agent, or Firm* — Carrier Blackman & Associates, P.C.; Joseph P. Carrier; William D. Blackman

(57) ABSTRACT

The object of the present invention is to provide a tire sealant and tire repair kit having excellent injectability. The present invention is a tire sealant containing a natural rubber latex, a synthetic resin emulsion, an anti-freezing agent, and at least one type of substance selected from the group consisting of a compound A represented by the following formula (1) and an anti-desiccant, a content of the substance being 0.3 to 10 mass %; and a tire repair kit using the same.

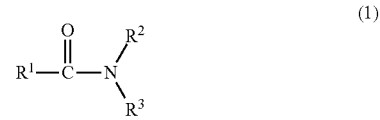

(1)

In formula (1), $R^1$ is an amino group, a hydrogen atom, or a hydrocarbon group; and $R^2$ and $R^3$ are each independently a hydrocarbon group optionally comprising a heteroatom, or a hydrogen atom.

18 Claims, No Drawings

TIRE SEALANT AND TIRE REPAIR KIT

TECHNICAL FIELD

The present invention relates to a tire sealant and a tire repair kit.

BACKGROUND ART

In recent years, puncture repair kits are increasingly introduced as standard or optional equipment in automobiles. A puncture repair kit comprising a tire sealant, a compressor, and the like which are combined and compactly packaged is known.

When a tire is punctured, the puncture repair kit is used by injecting the tire sealant using the compressor or the like into the interior of the tire through the valve of the tire, enabling the tire to be returned to a usable state.

The tire sealants containing, for example, a natural rubber latex, a synthetic resin emulsion, and an anti-freezing agent have been proposed (for example, see Patent Document 1).

Patent Document 1 describes a tire sealant containing a natural rubber latex, an ethylene-vinyl acetate resin emulsion, a polyolefin emulsion, and an anti-freezing agent; the mass ratio (natural rubber/ethylene-vinyl acetate resin) of the solid components of the natural rubber latex and the ethylene-vinyl acetate resin emulsion being 15:85 to 80:20; and the solid content of the polyolefin emulsion being from 0.5 to 10 parts by mass per 100 parts by mass of the total solid components of the natural rubber latex and ethylene-vinyl acetate resin emulsion.

CITATION LIST

Patent Literature

Patent Document 1: JP 2011-162681 A

SUMMARY OF INVENTION

Technical Problem

Based on this, the inventors, referring to Patent Document 1, prepared and evaluated a tire sealant containing a natural rubber latex, a synthetic resin emulsion, and an anti-freezing agent, revealing that there was potential to further improve the injectability of such a tire sealant.

Thus, an object of the present invention is to provide a tire sealant with excellent injectability.

Another object of the present invention is to provide a tire repair kit.

Solution to Problem

As a result of dedicated research to solve the problem described above, the inventors discovered that the desired effects can be obtained by including a natural rubber latex, a synthetic resin emulsion, an anti-freezing agent, and the specific substance described hereafter with the content of the specific substance being within a specific range, thereby arriving at the present invention.

The present invention is based on the findings described above and, specifically, solves the problem described above by the following features.

1. A tire sealant containing:
   a natural rubber latex;
   a synthetic resin emulsion;
   an anti-freezing agent; and
   at least one type of substance selected from the group consisting of a compound A represented by the following formula (1) and an anti-desiccant,
   a content of the substance being 0.3 to 10 mass %;

[Chemical Formula 1]

(1)

in formula (1), $R^1$ is an amino group, a hydrogen atom, or a hydrocarbon group; and $R^2$ and $R^3$ are each independently a hydrocarbon group optionally comprising a heteroatom, or a hydrogen atom.

2. The tire sealant according to 1, wherein the synthetic resin emulsion is at least one type selected from the group consisting of an ethylene-vinyl acetate based copolymer emulsion, a vinyl acetate homopolymer emulsion, and a polysilicone emulsion.

3. The tire sealant according to 1 or 2, wherein the anti-freezing agent is at least one type selected from the group consisting of ethylene glycol, propylene glycol, diethylene glycol and glycerin.

4. The tire sealant according to any one of 1 to 3, wherein the natural rubber latex has a solid content 1 that is from 25 to 95 mass % of the total of the solid content 1 and a solid content 2 of the synthetic resin emulsion.

5. The tire sealant according to any one of 1 to 4, further containing a surfactant.

6. The tire sealant according to any one of 1 to 5, wherein the anti-desiccant is at least one type selected from the group consisting of a modified urea and a phenolic compound.

7. A tire repair kit comprising the tire sealant described in any one of 1 to 6 and a compressor.

Advantageous Effects of Invention

The tire sealant of the present invention has excellent injectability.

The tire repair kit of the present invention has excellent tire sealant injectability.

DESCRIPTION OF EMBODIMENTS

Embodiments of the present invention are described in detail below.

As used herein, (meth)acrylic indicates acrylic or methacrylic, (meth)acryloyl indicates acryloyl or methacryloyl, and (meth)acryl indicates acryl or methacryl.

Furthermore, in the present specification, numerical ranges indicated using "(from) . . . to . . . " include the former number as the lower limit value and the later number as the upper limit value.

In the present specification, unless otherwise noted, a single corresponding substance may be used for each component, or a combination of two or more types of corresponding substances may be used for each component. When a component includes two or more types of substances that count as the component, the content of the component indicates the total content of the two or more types of substances.

In an embodiment of the present invention, the natural rubber latex contains a dispersion medium and natural rubber as a dispersoid, the natural rubber being dispersed in the dispersion medium. The synthetic resin emulsion contains a dispersion medium and a synthetic resin as a dispersoid, the synthetic resin being dispersed in the dispersion medium. In an embodiment of the present invention, the concept of "emulsion" includes suspensions (systems in which a solid-phase dispersoid is dispersed in a liquid-phase dispersion medium) and systems in which a liquid-phase dispersoid is dispersed in a liquid-phase dispersion medium.

There is no particular limitation upon the dispersion medium included in the natural rubber latex and the synthetic resin emulsion. Examples include water and mixtures of water and water-soluble organic solvents.

In an embodiment of the present invention, the solid component of the natural rubber latex refers to natural rubber. The solid content of the natural rubber latex refers to the natural rubber content of the natural rubber latex, or the total content of components other than the dispersion medium in the natural rubber latex. In an embodiment of the present invention, the natural rubber content of the natural rubber latex and the total content of components other than the dispersion medium in the natural rubber latex are substantially identical.

In the present invention, the solid component of the synthetic resin emulsion refers to synthetic resin. The solid content of the synthetic resin emulsion refers to the synthetic resin content of the synthetic resin emulsion, or to the total content of components other than the dispersion medium in the synthetic resin emulsion. In an embodiment of the present invention, the synthetic resin content of the synthetic resin emulsion and the content of components other than the dispersion medium in the synthetic resin emulsion are substantially identical.

Tire Sealant

The tire sealant of an embodiment of the present invention contains:
a natural rubber latex,
a synthetic resin emulsion,
an anti-freezing agent, and
at least one type of substance selected from the group consisting of a compound A represented by the following formula (1) and an anti-desiccant,
a content of the substance being 0.3 to 10 mass %.

[Chemical Formula 2]

(1)

In formula (1), $R^1$ is an amino group, a hydrogen atom, or a hydrocarbon group; and $R^2$ and $R^3$ are each independently a hydrocarbon group optionally comprising a heteroatom, or a hydrogen atom.

As used herein, "specific substance" may refer to at least one type of substance selected from the group consisting of a compound A represented by formula (1) and an anti-desiccant.

In the present invention, the content of the specific substance is in terms of mass % with respect to the total mass of the tire sealant.

The tire sealant of the present invention is believed to yield the desired effects by virtue of these features. Although the reason is not clear, it is assumed to be as follows.

As discussed above, ordinary tire sealants are injected into the interior of a tire through a valve of the tire using a compressor or the like. Metal parts such as valve cores are incorporated into the valve. When injected into the tire under pressure by the compressor or the like, the tire sealant passes through the narrow valve and contacts the metal or the like. The inventors discovered that the injectability of the tire sealant into tires will decrease if the contact angle of the tire sealant with respect to the metal or the like at this time is too great.

In the present invention, the inventors discovered that the content of the specific substance within a specific range reduces the contact angle of the tire sealant with respect to metal or the like.

This is believed to be because, when the specific substance is compound A, compound A deproteinizes the natural rubber constituting the dispersoid in the natural rubber latex by separating proteins from the natural rubber so that surfactants can be more easily adsorbed on the deproteinized natural rubber, thereby further stabilizing the dispersion of the deproteinized natural rubber latex compared to the natural rubber latex prior to deproteinization. The stabilization of the natural rubber latex is believed to stabilize the synthetic resin emulsion as well.

When the specific substance is an anti-desiccant, the anti-desiccant forms a pseudo-agglutinate with the water, thereby preventing desiccation of the surfaces of the dispersoid in the natural rubber latex and the synthetic resin emulsion when the tire sealant is injected under pressure into the interior of the tire in a vaporous form through the narrow valve by the compressor or the like, and stabilizing the dispersions of the natural rubber latex and the synthetic resin emulsion.

It is assumed that, as a result of the matters described above, a good dispersion of dispersoids of the natural rubber latex and the synthetic resin emulsion contained in the tire sealant can be maintained, even when the tire sealant is subjected to conditions of pressurization and contact with metal or the like, thereby making it possible to efficiently inject the tire sealant into a tire (i.e., yielding excellent injectability).

The various components of the tire sealant of the present invention will be described in detail hereafter.

Natural Rubber Latex

There is no particular limitation upon the natural rubber latex contained in the tire sealant of the present invention. Examples of the natural rubber latex include non-deproteinized natural rubber latexes and protein-containing natural rubber latexes. The natural rubber latex may also be a deproteinized natural rubber latex.

There is no particular limitation upon the method used to produce the natural rubber latex.

Synthetic Resin Emulsion

There is no particular limitation upon the synthetic resin emulsion contained in the tire sealant of the present invention.

Examples of the synthetic resin emulsion include a vinyl acetate based polymer emulsion, and a polysilicone emulsion.

There is no particular limitation upon the vinyl acetate based polymer emulsion as long as the vinyl acetate based polymer contained in the emulsion is a polymer comprising a vinyl acetate based repeating unit.

There is no particular limitation upon the polysilicone emulsion as long as the polysilicone contained in the emulsion is a polymer having a siloxane backbone (—(Si—O)$_n$—; n≥2).

Vinyl Acetate Based Polymer Emulsion

The vinyl acetate based polymer contained in the vinyl acetate based polymer emulsion may be either a homopolymer or copolymer of vinyl acetate.

In a case where the vinyl acetate based polymer is a copolymer, there is no particular limitation upon the monomer other than vinyl acetate as long as it is a compound comprising an ethylenically unsaturated bond. Examples include olefins such as ethylene; VeoVa (an ester of versatic acid and vinyl alcohol); (meth)acrylic monomers such as (meth)acrylic esters and (meth)acrylic acid; and aromatic vinyl compounds such as styrene.

Examples of the vinyl acetate based polymer emulsion include vinyl acetate homopolymer emulsions and vinyl acetate copolymer emulsions.

Examples of vinyl acetate copolymer emulsions include ethylene-vinyl acetate based copolymer emulsions.

The ethylene-vinyl acetate based copolymer emulsion is preferably at least one type selected from the group consisting of an ethylene-vinyl acetate copolymer emulsion, an ethylene-vinyl acetate-VeoVa copolymer emulsion, and an ethylene-vinyl acetate-VeoVa-(meth)acrylic monomer copolymer emulsion. Examples of the (meth)acrylic monomer forming part of the ethylene-vinyl acetate-VeoVa-(meth)acrylic monomer copolymer include compounds comprising a (meth)acryloyloxy group (such as (meth)acrylic esters and (meth)acrylic acid).

For the perspective of more excellent injectability and storage stability, the synthetic resin emulsion is especially preferably at least one type selected from the group consisting of an ethylene-vinyl acetate based copolymer emulsion, a vinyl acetate homopolymer emulsion, and a polysilicone emulsion.

There is no particular limitation upon the method of producing the synthetic resin emulsion. A commercially available synthetic resin emulsion can be used.

Total of solid content 1 of natural rubber latex and solid content 2 of synthetic resin emulsion.

For the perspective of more excellent injectability and excellent storage stability, the total of the solid content 1 of the natural rubber latex and the solid content 2 of the synthetic resin emulsion is preferably from 15 to 85 mass %, more preferably from 20 to 80 mass %, of the total mass of the tire sealant.

Solid Content 1 of Natural Rubber Latex

For the perspective of more excellent injectability and excellent repair ability, the solid content 1 of the natural rubber latex is preferably from 25 to 95 mass %, more preferably from 35 to 90 mass %, of the total of the solid content 1 of the natural rubber latex and the solid content 2 of the synthetic resin emulsion.

Water Content of Tire Sealant

For the perspective of more excellent injectability and excellent fluidity within tire interiors, the water content (total amount of water) in the tire sealant of an embodiment of the present invention is preferably from 5 to 50 mass %, more preferably from 10 to 40 mass %, of the total mass of the tire sealant.

Anti-Freezing Agent

There is no particular limitation upon the anti-freezing agent contained in the tire sealant of an embodiment of the present invention as long as it is an anti-freezing agent that can ordinarily be included in tire sealants.

For the perspective of more excellent injectability and excellent low viscosity at low temperatures, the anti-freezing agent is especially preferably at least one type selected from the group consisting of ethylene glycol, propylene glycol, diethylene glycol, and glycerin.

For the perspective of more excellent injectability and excellent low viscosity at low temperatures, the anti-freezing agent content is preferably from 20 to 80 mass %, more preferably from 35 to 65 mass %, of the total mass of the water and anti-freezing agent contained in the tire sealant of an embodiment of the present invention.

At Least One Type of Substance Selected from the Group Consisting of Compound A Represented by (1) and an Anti-Desiccant.

The tire sealant of an embodiment of the present invention contains at least one type of substance selected from the group consisting of a compound A represented by (1) and an anti-desiccant.

The anti-desiccant does not contain the compound A.

Compound A

Compound A above is a compound represented by the following formula (1).

[Chemical Formula 3]

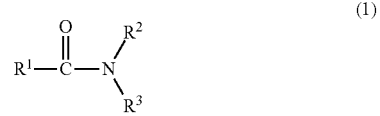

In formula (1), $R^1$ is an amino group (—NH$_2$), a hydrogen atom, or a hydrocarbon group; and $R^2$ and $R^3$ are each independently a hydrocarbon group optionally comprising a heteroatom, or a hydrogen atom.

There is no particular limitation upon the hydrocarbon group in the present invention. Examples of hydrocarbon groups include aliphatic hydrocarbon groups (including straight-chain, branched chain, and cyclic), aromatic hydrocarbon groups, and combinations thereof. The hydrocarbon group may have an unsaturated bond.

The number of carbon atoms in the hydrocarbon group is preferably 20 or less, more preferably from 1 to 15.

Examples of hydrocarbon groups include aliphatic hydrocarbon groups such as methyl groups, ethyl groups, butyl groups, pentyl groups, hexyl groups, octyl groups, decyl groups, and dodecyl groups.

There is no particular limitation upon the heteroatom in the present invention. Examples of heteroatoms include oxygen atom, nitrogen atoms, sulfur atoms, and halogens. The heteroatom may bond with another heteroatom, a carbon atom, or a hydrogen atom to form a functional group. In one preferred embodiment, if $R^1$ is an amino group, $R^2$ and $R^3$ are each independently a hydrocarbon group or a hydrogen atom.

Examples of compound A include compounds in which $R^1$ is an amino group; compounds in which R is a hydrogen atom; and compounds in which R is a hydrocarbon group.

An example of compounds in which $R^1$ is an amino group is urea (NH$_2$CONH$_2$).

Examples of compounds in which $R^1$ is a hydrogen atom include N,N-dimethyl formamide and N-methyl-N-isopropyl formamide.

Examples of compounds in which $R^1$ is a hydrocarbon group include N,N-dimethyl acetamide and N-methyl-N-isopropyl acetamide.

For the perspective of more excellent injectability and excellent storage stability, compound A is especially preferably a compound in which $R^1$ is an amino group, and more preferably urea.

Anti-Desiccant

The anti-desiccant is capable of preventing water from drying.

For the perspective of more excellent injectability and excellent safety, the anti-desiccant is preferably at least one type selected from the group consisting of a modified urea and a phenolic compound.

The modified urea is urea that has been modified. An example of the modified urea is urethane-modified urea (urea that has been modified by urethane).

There is no particular limitation upon the phenolic compound as long as it is a compound comprising a phenol backbone. In the present invention, phenolic compounds include phenolic derivatives.

For the perspective of more excellent injectability and excellent safety, the anti-desiccant is preferably a modified urea, and more preferably urethane-modified urea.

A commercially available anti-desiccant can be used. Examples of commercially available anti-desiccants include those under the trade names BYKETOL-PC (urethane-modified urea) and BYKETOL-AQ (low-molecular-weight polymer mixture), both available from Tetsutani Co., Ltd., and that under the trade name DISPARLON 503 (phenolic derivative; available from Kusumoto Chemicals, Ltd.).

Specific Substance Content

In an embodiment of the present invention, the specific substance content is from 0.3 to 10 mass % of the total mass of the tire sealant. The tire sealant will have excellent injectability if the content of the specific substance is within this range.

For the perspective of more excellent injectability and excellent storage stability, the specific substance content is preferably from 0.3 to 9.5 mass %, more preferably from 0.5 to 9.5 mass %, of the total mass of the tire sealant.

Surfactant

In one preferred embodiment, the tire sealant of an embodiment of the present invention further contains a surfactant.

There is no particular limitation upon the surfactant. Examples include non-ionic, anionic, cationic, and zwitterionic surfactants.

Examples of non-ionic surfactants include polyoxyethylene alkyl ethers, polyoxyethylene alkyl phenyl ethers, polyoxyethylene alkylamines, polyoxyethylene alkylamides, polyoxyethylene fatty acid esters, polyoxyethylene castor oil, polyoxyethylene fatty acid diesters, polyoxyethylene rosin esters, polyoxyethylene lanolin ethers, polyoxyethylene polyhydric alcohol ethers, polyoxyethylene polyhydric alcohol fatty acid esters, polyhydric alcohol fatty acid esters, fatty acid alkanolamides, and the like. The non-ionic surfactant preferably has an HLB of from 12.0 to 19.0.

HLB refers to the value calculated via the Oda equation based on the organic conceptual diagram; this calculation method is described, for example, in Nyuka/Kayoka no Gijutsu ("*Emulsification/Solubilization Techniques*") (1976, Kogaku Tosho Co., Ltd.). The organicity and inorganicity values used to derive HLB can be calculated using the inorganic group table (values reported by Fujita et al., 1974) described in Yuki Gainenzu-Kiso to Oyo-("*The Organic Conceptual Diagram-Fundamentals and Applications-*") (1984, Sankyo Shuppan Co., Ltd.).

Examples of polyoxyethylene alkyl ethers include polyoxyethylene decyl ether, polyoxyethylene lauryl ether, polyoxyethylene cetyl ether, polyoxyethylene stearyl ether, polyoxyethylene oleyl ether, polyoxyethylene 2-ethylhexyl ether, polyoxyethylene isodecyl ether, polyoxyethylene tridecyl ether, and polyoxyethylene isostearyl ether.

Examples of anionic surfactants include alkyl sulfate salts (such as sodium lauryl sulfate), alkyl ether sulfate salts, polyoxyethylene alkyl ether sulfate salts, polyoxyethylene alkyl phenyl ether sulfate salts, alkylbenzene sulfonate salts, alkylnaphthalene sulfonate salts, higher fatty acid salts (soaps), α-sulfo fatty acid methyl ester salts (α-MES), α-olefin sulfonate salts, alkane sulfonate salts, (mono) alkyl phosphate salts, polyoxy-mono and di-styryl phenylether sulfosuccinic monoester salts, and alkyl phenoxy polyoxyethylene propyl sulfonate salts.

Examples of cationic surfactants include tetraalkyl ammonium chloride, trialkyl benzyl ammonium chloride, alkylamines, monooxyethylene alkylamines, and polyoxyethylene alkylamines.

For the perspective of more excellent injectability into tires at high temperatures, excellent sealing properties and storage properties, the surfactant preferably includes a non-ionic surfactant and an anionic surfactant.

When using a combination of a non-ionic surfactant and an anionic surfactant, the mass ratio (non-ionic surfactant/anionic surfactant) of the non-ionic surfactant and the anionic surfactant is preferably 1.0:1.0 to 1.0:10.0. The ratio within this range yields more excellent injectability into tires, excellent sealing properties and storage properties.

For the perspective of more excellent injectability into tires, excellent sealing properties and storage properties, the surfactant content (or total content if multiple types are used in combination) is preferably from 1.0 to 6.0 parts by mass per 100 parts by mass of the solid component of the natural rubber latex.

Other Components

In addition to the components described above, the tire sealant of an embodiment of the present invention can optionally contain additives such as fillers, anti-aging agents, antioxidants, pigments, plasticizers, thixotropic agents, UV absorbents, flame retardants, dispersants, dehydrating agents, antistatic agents, and gelling agents.

Production Method

There is no particular limitation upon the method by which the tire sealant of an embodiment of the present invention is produced. One example includes adding the natural rubber latex, synthetic resin emulsion, anti-freezing agent, and the specific substance, as well as any surfactants and additives as desired, and thoroughly mixing at reduced pressure using a mixer such as a combination mixer.

Water may be further added to the system as necessary.

It is believed that, if the tire sealant of an embodiment of the present invention contains compound A, the natural rubber in the natural rubber latex can be deproteinized by separating proteins belonging to the natural rubber from the natural rubber.

The tire sealant of an embodiment of the present invention may contain separated proteins.

There is no particular limitation upon the temperature at which the tire sealant of an embodiment of the present invention is used; the tire sealant can be used in a wide range of temperature conditions. For example, the temperature may be from −40 to 80° C.

Tire Repair Kit

The tire repair kit of an embodiment of the present invention is a tire repair kit comprising the tire sealant of an embodiment of the present invention and a compressor.

There is no particular limitation upon the tire sealant used in the tire repair kit of an embodiment of the present invention as long as it is a tire sealant according to an embodiment the present invention.

There is no particular limitation upon the compressor used in the tire repair kit of an embodiment of the present invention. An example is an air compressor. In one preferred embodiment, the compressor is a low-capacity compressor that draws power from the cigarette lighter socket of an automobile.

EXAMPLES

The present invention is described below in detail using examples, but the present invention is not limited to such examples.
Production of Tire Sealant
The components listed in Tables 1 and 2 below were mixed in an agitator in the compositions (parts by mass) listed in the tables to produce tire sealants.
Evaluation
The following evaluations were performed for the tire sealants produced as described above. Results are shown in Tables 1 and 2. Desiccation properties are evaluated in Table 2 only.
Injectability at +70° C.

350 mL of the sealants produced as described above were heated to 70° C.

Using a compressor, the tire sealants were injected through the valve core into the interior of a 195/65 R15 tire (comprising a puncture hole (diameter: 4 mm) in a shoulder groove of the tread) at an injection pressure of 300 kPa, and the time from start to completion of injection was measured.
Evaluation criteria An injection time within 40 seconds indicates excellent injectability.

An injection time within 30 seconds indicates more excellent injectability.
Puncture Repair Distance: Evaluation of Sealing Properties A puncture hole (diameter: 4 mm) was made in a shoulder groove of the tread of a 215/60 R16 tire.

Next, the punctured tire was mounted on a drum testing machine, 350 mL of the sealant produced as described above was injected through the valve core of the tire, and the tire was inflated to an internal pressure of 200 kPa.

The tire was then subjected to repeated intermittent driving by driving the tire at a speed of 30 km/h under a load of 350 kg, then stopping the tire, and the travel distance at which the tire puncture could be repaired until air ceased to leak (puncture repair distance) was measured. The presence/absence of air leakage was confirmed by spraying soapy water over the part with the puncture hole, and determining whether the soapy water formed bubbles.
Evaluation Criteria A puncture repair distance within 6 km indicates excellent sealing properties.
Drying Properties 10 g of the sealant produced as described above was dripped at 23° C., after which the surface of the tire sealant was visually observed, and the time for a film to form on the surface of the tire sealant was measured.

The longer the time for a film to form on the surface of the tire sealant is, the more desiccation of the tire sealant is suppressed; this suppression of desiccation is believed to impart excellent injectability into tires.

TABLE 1

|  | Comparative Example | Example | | | | | | Comparative Example |
| --- | --- | --- | --- | --- | --- | --- | --- | --- |
|  | 1 | 1 | 2 | 3 | 4 | 5 | 6 | 2 |
| Water | 16.5 | 16.5 | 16.5 | 16.5 | 16.5 | 16.5 | 16.5 | 16.5 |
| NR latex 1 | 33.7 | 33.7 | 33.7 | 33.7 | 33.7 | 33.7 | 33.7 | 33.7 |
| Surfactant 1 | 0.41 | 0.41 | 0.41 | 0.41 | 0.41 | 0.41 | 0.41 | 0.41 |
| Surfactant 2 | 0.41 | 0.41 | 0.41 | 0.41 | 0.41 | 0.41 | 0.41 | 0.41 |
| Compound A1 |  | 0.5 | 1 | 2 | 5 | 10 |  | 0.1 |
| (Compound A1 content with respect to total mass of tire sealant: in mass %) |  | (0.5) | (1) | (2) | (5) | (9) |  | (0.1) |
| Compound A2 |  |  |  |  |  |  | 5 |  |
| (Compound A2 content with respect to total mass of tire sealant: in mass %) |  |  |  |  |  |  | (5) |  |
| Synthetic resin emulsion 1 | 9.575 | 9.575 | 9.575 | 9.575 | 9.575 | 9.575 | 9.575 | 9.575 |
| Anti-freezing agent 1 | 39.45 | 39.45 | 39.45 | 39.45 | 39.45 | 39.45 | 39.45 | 39.45 |
| Total | 100.045 | 100.545 | 101.045 | 102.045 | 105.045 | 110.045 | 105.045 | 100.145 |
| Injectability (seconds) at +70° C. | 45 | 25 | 25 | 23 | 17 | 27 | 30 | 68 |
| Puncture repair distance (km) | — | 3.5 | 4.5 | 4.5 | 6.0 | 6.0 | 7.5 | 15 |

TABLE 1-continued

|  | Comparative Example 3 | Example 7 | Example 8 | Comparative Example 4 | Example 9 |
|---|---|---|---|---|---|
| Water | 16.5 | 16.5 | 16.5 | 16.5 | 16.5 |
| NR latex 1 | 33.7 | 33.7 | 33.7 | 33.7 | 33.7 |
| Surfactant 1 | 0.41 | 0.41 | 0.41 | 0.41 | 0.41 |
| Surfactant 2 | 0.41 | 0.41 | 0.41 | 0.41 | 0.41 |
| Compound A1 |  | 1 | 10 |  | 10 |
| (Compound A1 content with respect to total mass of tire sealant: in mass %) |  | (1) | (9.5) |  | (8.4) |
| Compound A2 |  |  |  |  |  |
| (Compound A2 content with respect to total mass of tire sealant: in mass %) |  |  |  |  |  |
| Synthetic resin emulsion 1 | 9.575 | 9.575 | 9.575 | 9.575 | 9.575 |
| Anti-freezing agent 1 | 34.24 | 34.24 | 34.24 | 44.5 | 44.5 |
| Total | 94.835 | 95.835 | 104.835 | 105.095 | 115.095 |
| Injectability (seconds) at +70° C. | 43 | 20 | 20 | 66 | 17 |
| Puncture repair distance (km) | — | 3.5 | 4.5 | 4.5 | 6.0 |

TABLE 3

|  | Comparative Example | Example | Example |
|---|---|---|---|
| Table 2 | 1 | 10 | 11 |
| Water | 16.5 | 16.5 | 16.5 |
| NR latex 1 | 33.7 | 33.7 | 33.7 |
| Surfactant 1 | 0.41 | 0.41 | 0.41 |
| Surfactant 2 | 0.41 | 0.41 | 0.41 |
| Anti-desiccant 1 |  | 0.7 | 5 |
| (Anti-desiccant 1 content with respect to total mass of tire sealant: in mass %) |  | (0.7) | (4.8) |
| Synthetic resin emulsion 1 | 9.575 | 9.575 | 9.575 |
| Anti-freezing agent 1 | 39.45 | 39.45 | 39.45 |
| Total | 100.045 | 100.745 | 105.045 |
| Injectability (seconds) at +70° C. | 45 | 20 | 20 |
| Puncture repair distance (km) | — | 6 | 4.5 |
| Desiccation properties (seconds) | 600< | 360 | 240 |

The details of the components listed in Tables 1 and 2 are as follows.

Water: Distilled water

NR latex 1: natural rubber latex (trade name: Hytex HA; available from Golden Hope Co., Ltd.; solid content: 60 mass %). NR latex 1 is not deproteinized, and contains proteins.

Surfactant 1: anionic surfactant, sodium lauryl sulfate (product name: Emal 10PT; available from Kao Corp.)

Surfactant 2: non-ionic surfactant, polyoxyethylene oleyl ether (Emulgen 430 (E430); available from Kao Corp.)

Compound A1: Urea ($NH_2CONH_2$) (available from Wako Pure Chemical Corp.)

Compound A2: N,N-dimethyl formamide (available from Wako Pure Chemical Corp.)

Anti-desiccant 1: Urethane-modified urea; trade name BYKETOL-PC; available from Tetsutani and Co., Ltd.

Synthetic resin emulsion 1: vinyl versatate-ethylene-vinyl acetate copolymer resin emulsion (SUMIKAFLEX 950HQ, available from Sumika Chemtex Co., Ltd.; solid content of approximately 53 mass %; ethylene-vinyl acetate copolymer Tg=−30° C.)

Anti-freezing agent 1: propylene glycol (available from ADEKA Corporation; industrial propylene glycol)

As is clear from the results shown in Tables 1 and 2, Comparative Examples 1, 3, and 4, which did not contain the specific substance, had poor injectability.

Comparative Example 2, which had a specific substance content outside of the prescribed range, had poor injectability.

By contrast, the tire sealant of an embodiment of the present invention had excellent injectability.

A comparison of Examples 1 to 5 shows that Example 4 had the most excellent injectability.

A comparison of Examples 4 and 6 shows that Example 4, which contains compound A1, had better injectability and sealing properties than Example 6, which contains compound A2.

A comparison of Examples 5, 8, and 9 shows that Example 9 had the most excellent injectability.

The results in Table 2 are believed to prove that, when an anti-desiccant is included in the tire sealant of an embodiment of the present invention, the anti-desiccant suppresses desiccation of the tire sealant, thereby yielding excellent injectability.

The invention claimed is:

1. A tire sealant comprising:
   a natural rubber latex;
   a synthetic resin emulsion;
   an anti-freezing agent; and
   at least one type of substance selected from the group consisting of a compound A represented by the formula (1) and an anti-desiccant, a content of the substance being 0.3 to 10 mass %;

[Chemical Formula 1]

 (1)

in formula (1), $R^1$ is an amino group, a hydrogen atom, or a hydrocarbon group; and $R^2$ and $R^3$ are each independently a hydrocarbon group optionally comprising a heteroatom, or a hydrogen atom.

2. The tire sealant according to claim 1, wherein the synthetic resin emulsion is at least one type selected from the group consisting of an ethylene-vinyl acetate based copolymer emulsion, a vinyl acetate homopolymer emulsion, and a polysilicone emulsion.

3. The tire sealant according to claim 1, wherein the anti-freezing agent is at least one type selected from the group consisting of ethylene glycol, propylene glycol, diethylene glycol and glycerin.

4. The tire sealant according to claim 1, wherein the natural rubber latex has a solid content 1 that is from 25 to 95 mass % of the total of the solid content 1 and a solid content 2 of the synthetic resin emulsion.

5. The tire sealant according to claim 1, further comprising a surfactant.

6. The tire sealant according to claim 1, wherein the anti-desiccant is at least one type selected from the group consisting of a modified urea and a phenolic compound.

7. A tire repair kit comprising the tire sealant described in claim 1 and a compressor.

8. The tire sealant according to claim 2, wherein the anti-freezing agent is at least one type selected from the group consisting of ethylene glycol, propylene glycol, diethylene glycol and glycerin.

9. The tire sealant according to claim 2, wherein the natural rubber latex has a solid content 1 that is from 25 to 95 mass % of the total of the solid content 1 and a solid content 2 of the synthetic resin emulsion.

10. The tire sealant according to claim 2, further comprising a surfactant.

11. The tire sealant according to claim 2, wherein the anti-desiccant is at least one type selected from the group consisting of a modified urea and a phenolic compound.

12. The tire sealant according to claim 3, wherein the natural rubber latex has a solid content 1 that is from 25 to 95 mass % of the total of the solid content 1 and a solid content 2 of the synthetic resin emulsion.

13. The tire sealant according to claim 3, further comprising a surfactant.

14. The tire sealant according to claim 3, wherein the anti-desiccant is at least one type selected from the group consisting of a modified urea and a phenolic compound.

15. The tire sealant according to claim 4, further comprising a surfactant.

16. The tire sealant according to claim 4, wherein the anti-desiccant is at least one type selected from the group consisting of a modified urea and a phenolic compound.

17. The tire sealant according to claim 5, wherein the anti-desiccant is at least one type selected from the group consisting of a modified urea and a phenolic compound.

18. A tire repair kit comprising the tire sealant described in claim 6 and a compressor.

* * * * *